(12) United States Patent
Parks

(10) Patent No.: US 8,356,770 B2
(45) Date of Patent: Jan. 22, 2013

(54) TAIL-MOUNTED POINTABLE SOLAR PANELS FOR SOLAR-POWERED AIRCRAFT

(75) Inventor: Robert Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 279 days.

(21) Appl. No.: 12/904,562

(22) Filed: Oct. 14, 2010

(65) Prior Publication Data
US 2011/0084170 A1  Apr. 14, 2011

Related U.S. Application Data

(60) Provisional application No. 61/251,456, filed on Oct. 14, 2009.

(51) Int. Cl.
*B64C 9/06* (2006.01)

(52) U.S. Cl. ............................................. 244/87; 244/46

(58) Field of Classification Search .................. 244/7 B, 244/7 R, 39, 46, 47, 48, 87
See application file for complete search history.

(56) References Cited

U.S. PATENT DOCUMENTS
2009/0292407 A1 * 11/2009 Minelli et al. .................... 701/3

* cited by examiner

*Primary Examiner* — Timothy D Collins
*Assistant Examiner* — Nicholas McFall
(74) *Attorney, Agent, or Firm* — Katten Muchin Rosenman LLP (57) ABSTRACT

An aircraft tail section has a first tail component and a second tail component, the first tail component being positioned further forward than the second tail component with respect to a nose of the aircraft. Each tail component has two surfaces, each of the two surfaces of at least one of the first and second tail components comprises a solar panel configured to collect solar energy. Each tail component is rotatable with respect to a centerline of the aircraft such that an offset angle of between zero degrees and 180 degrees is formed between corresponding surfaces of the first and second tail components. Preferably, the tail components are rotated into (i) a takeoff and landing configuration that is substantially horizontal, and (ii) a crosswise configuration during flight such that collection of solar energy is maximized.

28 Claims, 6 Drawing Sheets

TAIL-MOUNTED POINTABLE SOLAR PANELS FOR SOLAR-POWERED AIRCRAFT

This application claims priority to U.S. Patent Appln. No. 61/251,456, filed Oct. 14, 2009, the contents of which are incorporated herein by reference.

The present invention was made with United States Government support under HR0011-08-C-0060, awarded by the Defense Advanced Research Projects Agency (DARPA). The U.S. Government has certain rights in the invention.

BACKGROUND OF THE INVENTION

1. Field of the Invention

The present invention relates to solar-powered aircraft. More particularly, the present invention relates to configurations for arranging solar panels on a tail portion of an aircraft to optimize collection of solar energy to fully or partially power the aircraft.

2. Related Art

The advantages of pointable solar panels for solar-powered aircraft have long been recognized. While some configurations (e.g., NASA CR-3699) have panels separate from the normal stabilizing or lifting surfaces of the aircraft, there are weight and drag advantages to installing the panels on surfaces that are already needed by the aircraft. The normal wings and horizontal tails work best with the sun nearly overhead. However, these horizontal panels are of little use for a solar powered aircraft that can operate at higher latitudes in the winter time, where the sun elevation angle may only be 10 to 20 degrees above horizontal, even at noon.

It is possible to place panels on the vertical tail of an aircraft, but this surface is of relatively small total area, and is ineffective at higher sun elevations.

A cruciform arrangement of flying surfaces with solar cells on one side of one surface can track the elevation of the sun perfectly with no additional drag penalty. An early concept with cruciform wings was shown by Phillips in U.S. Pat. No. 4,415,133, the entire contents of which are incorporated herein by reference. A similar arrangement can be implemented as a reduced size version for the tail of the aircraft, as shown in U.S. patent application Ser. No. 12/211,027, the entire contents of which are incorporated herein by reference. With appropriate sizing of the tail moment arms, it is possible to have tail surfaces where the horizontal stabilizer area and vertical stabilizer area requirements are similar. Thus a cruciform tail with equal size surfaces can meet the aerodynamic requirements with little or no penalty in mass and drag.

Previous concepts for these sun-tracking tails have been cruciform with all surfaces of equal size. This allows for mass balancing about the roll pivot axis, minimizing the loads on the tail rotation actuator. With good balance it is even possible to "fly" the tails in roll by using small ailerons at the tips of some of the surfaces.

However, while the size of a tail is much smaller than a wing, solar-powered aircraft tails may still be quite large. A typically sized tail may have a span of as much as 50 meters. Therefore, a landing gear having a height of 25 meters would be needed for a conventional takeoff and landing. This height would cause a very large penalty in mass and/or aerodynamic drag. Thus, while prior art has shown the advantages of a sun tracking tail, there are major disadvantages arising from the large height of the tail during takeoff and landing. In addition, only about one-quarter of the wetted area of the tail may be covered with effective solar cells. The present invention is intended to address these shortcomings.

SUMMARY OF THE INVENTION

In one aspect, the invention provides an aircraft comprising a tail section including at least a first tail component and a second tail component. The first tail component is positioned further forward than the second tail component with respect to a nose of the aircraft. Each of the two surfaces of at least one of the first and second tail components comprises a solar panel configured for collecting solar energy. Each of the first tail component and the second tail component is rotatable with respect to a centerline of the aircraft such that an offset angle of between zero degrees and 180 degrees is formed between corresponding surfaces of the first and second tail components.

The first and second tail components may be aligned substantially horizontally with respect to ground such that the offset angle is between zero degrees and five degrees and such that the aircraft is configured for takeoff or landing. The first and second tail components may be rotated such that the offset angle is between 45 degrees and 90 degrees while the aircraft is in flight.

The offset angle may be set such that a collectable amount of solar energy by the four solar panels is maximized. The first tail component may be rotated such that at least one of the two first tail component surfaces directly faces the sun while the aircraft is in flight. The second tail component may be rotated such that at least one of the two second tail component surfaces directly faces the sun while the aircraft is in flight. Alternately, a tail component may be rotated such that the two component surfaces are approximately an equal angle away from the sun such that the sun lies along the bisector of the component surface angles.

The first tail component may be rotated such that an angle between at least one of the two first tail component surfaces and the sun is between 40 degrees and 50 degrees, and the second tail component may be rotated such that an angle between at least one of the two second tail component surfaces and the sun is between 40 degrees and 50 degrees and the offset angle is between 80 degrees and 100 degrees.

The first tail component may comprise a first center of mass, the first center of mass being positioned along a roll pivot axis of the tail component about an aircraft fuselage. The second tail component may comprise a second center of mass, the second center of mass being positioned along the roll pivot axis of the second tail component about an aircraft fuselage. Each of the two surfaces of each of the first and second tail components may include a dihedral angle having a measure configured to ensure that the first and second centers of mass are positioned along the roll pivot axis of the respective tail component.

The first tail component may be pivotable about a first spanwise axis of the first tail component and configured to be rotated about the first spanwise axis such that a desired pitch control moment is caused. The second tail component may be pivotable about a second spanwise axis of the second tail component and configured to be rotated about the second spanwise axis such that a desired pitch control moment is caused. Each of the two surfaces of each of the first and second tail components may be offset from a boom portion of the aircraft to allow for free rotation of each tail component about the corresponding spanwise axis. Each respective spanwise axis may intersect a roll pivot axis of the tail component.

The first tail component may be pivotable about a first spanwise axis of the aircraft and configured to be rotated about the first spanwise axis such that a desired yaw control moment is caused. The second tail component may be pivotable about a second spanwise axis of the second tail component and configured to be rotated about the second spanwise axis such that a desired yaw control moment is caused. Each of the two surfaces of each of the first and second tail components may be offset from a boom portion of the aircraft to allow for free rotation of each tail component about the corresponding spanwise axis. Each respective spanwise axis may intersect a roll pivot axis of the tail component.

The aircraft may further comprise a control system configured for sensing a roll attitude of each of the two surfaces of each of the first and second tail components and for using ailerons to control an orientation of each of the first and second tail components. Each of the ailerons may be mounted to a respective one of the two surfaces of each of the first and second tail components. The aircraft may further comprise a roll pivot mechanism having at least one detent, the at least one detent being configured to hold the first tail component at a first predetermined roll angle until a first predetermined roll moment is applied to the first tail component. The aircraft may further comprising a roll pivot mechanism having at least one detent, the at least one detent being configured to hold the second tail component at a second predetermined roll angle until a second predetermined roll moment is applied to the second tail component. The roll pivot axis of the aircraft may include detents such that each surface is held in place against light loads but will roll when higher loads are encountered. The higher loads may result either from aileron control surfaces or from wind gusts. Alternatively, the aircraft may further comprise a control system configured for sensing a roll attitude of each of the two surfaces of each of the first and second tail components and for using a motorized actuator to control an orientation of each of the first and second tail components.

In another aspect, the invention provides an aircraft comprising a tail section. The tail section includes at least a first tail component and a second tail component. Each of the first and second tail components has a first surface and a second surface oriented in a substantially v-shaped configuration with respect to one another. The first tail component is positioned further forward than the second tail component with respect to a nose of the aircraft. Each of the first and second surfaces of each of the first and second tail components comprises a solar panel configured for collecting solar energy. Each of the first and second surfaces of the first tail component and each of the first and second surfaces of the second tail component is independently rotatable with respect to a centerline of the aircraft such that an offset angle of between zero degrees and 180 degrees is formed between corresponding surfaces of the first and second tail components.

In yet another aspect, the invention provides an aircraft comprising a tail boom and a tail section. The tail boom extends rearwardly with respect to a nose of the aircraft along a centerline of the aircraft. The tail section includes at least a first tail component and a second tail component. Each of the first and second tail components has two surfaces oriented in a substantially v-shaped configuration with a v-angle of between 160 degrees and 180 degrees. The first tail component is positioned further forward than the second tail component with respect to a nose of the aircraft. Each of the two surfaces of each of the first and second tail components comprises a solar panel configured for collecting solar energy. The first tail component is directly rotatable with respect to the tail boom. The first tail component comprises a first tail component boom extending rearwardly with respect to the nose of the aircraft along the centerline of the aircraft. The second tail component is directly rotatable with respect to the first tail component boom such that an offset angle of between zero degrees and 180 degrees is formed between corresponding surfaces of the first and second tail components. The second tail component may be configured for rotation only during takeoff and landing portions of a flight. The takeoff portion may include a first predetermined interval at a beginning of a flight, and the landing portion may include a second predetermined interval at an end of the flight, The second tail component may be configured to be in a locked position with respect to the first tail component during a remainder of the flight.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE PREFERRED EMBODIMENTS ACCORDING TO THE PRESENT INVENTION

Figure 1:
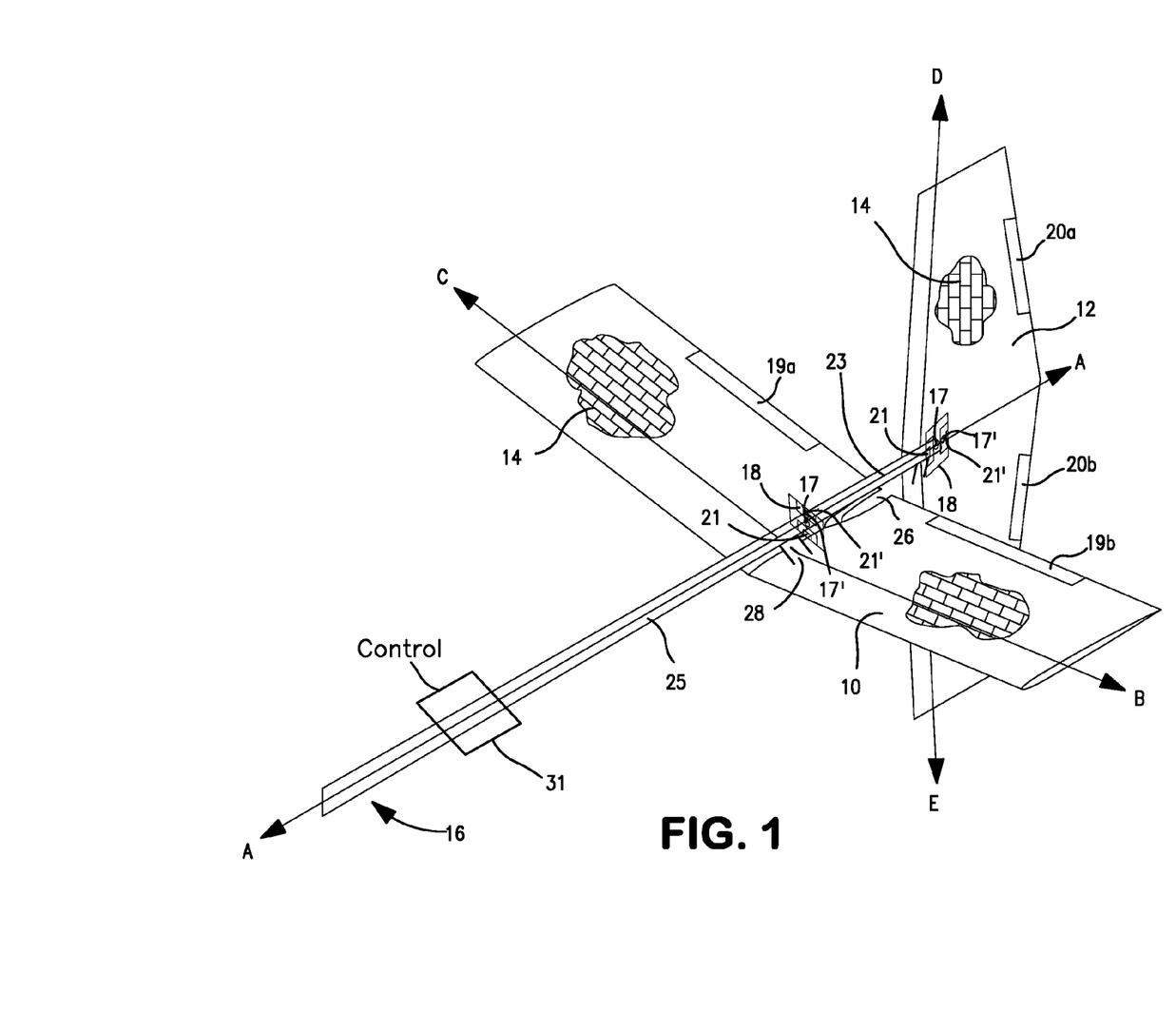
FIG. 1 illustrates a tail portion of an aircraft having first and second tail components configured in a night-flight mode, according to a preferred embodiment of the present invention.

In a preferred embodiments of the present invention, instead of a unitary X-shaped tail assembly, the tail assembly is split into two or more separate tail components, with at least a first (front) tail component 10 preferably located fully in front of a second (rear) tail component 12. Preferably, in normal flight, the tail components 10, 12 are rotated about roll axis A to be substantially perpendicular to each other in the front view. For example, FIG. 1 depicts the tail assembly for night-flight or flight where the sun is directly overhead. The first tail component 10 is positioned as a traditional fixed-wing horizontal stabilizer, while the second tail component 12 is positioned as a traditional vertical stabilizer. The solar cells 14 on the first tail component 10 are positioned to capture solar energy.

Figure 2:
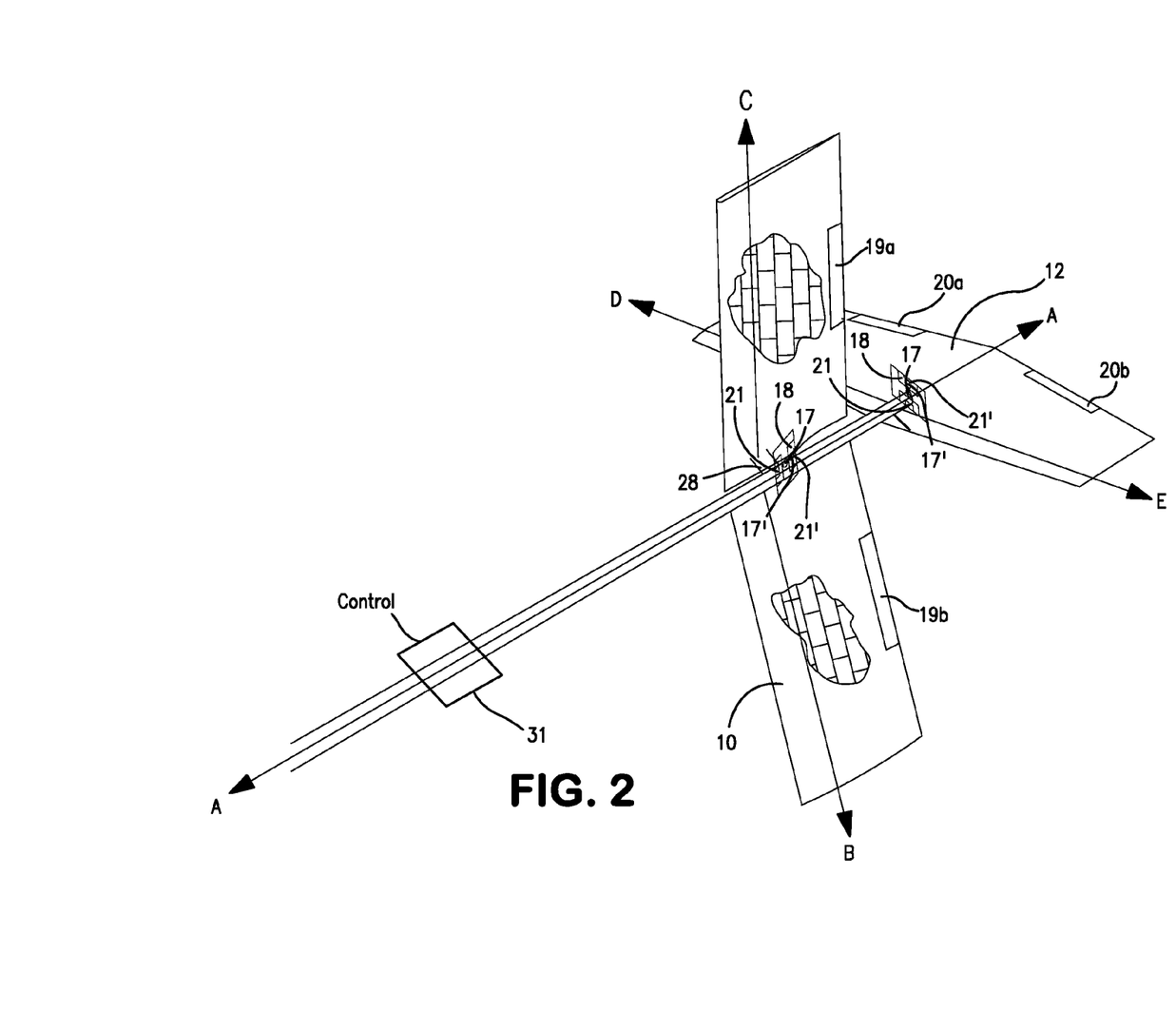
FIG. 2 illustrates a tail portion of an aircraft having first and second tail components configured for when the sun is on the horizon, according to a preferred embodiment of the present invention.
Figure 3:
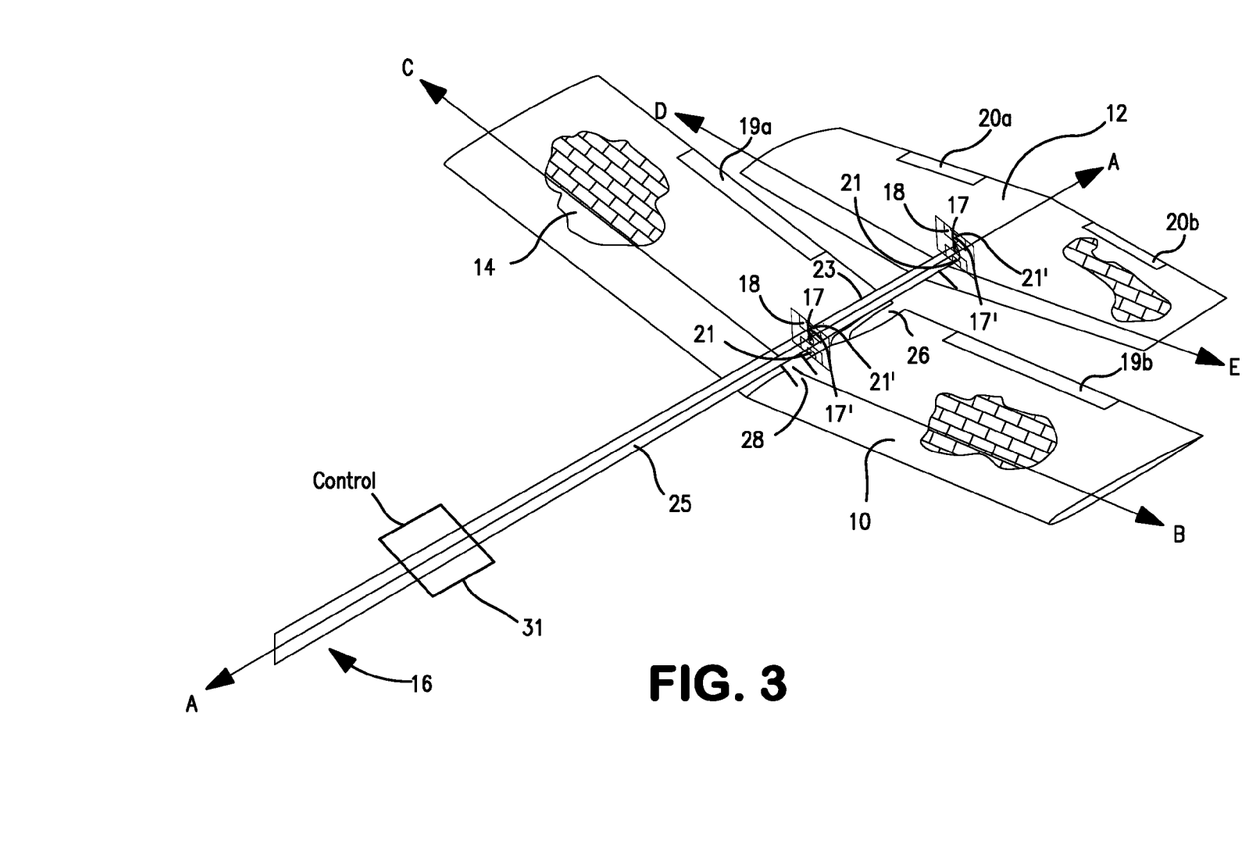
FIG. 3 illustrates a tail portion of an aircraft having first and second tail components configured for takeoff or landing, according to a preferred embodiment of the present invention.

In FIG. 2, the front tail component 10 is rotated to a vertical position, to capture solar energy when the sun is on or near the horizon (or when the aircraft is in a steep bank). In this configuration, the first tail component 10 also acts as a vertical stabilizer, while the second tail component acts as a horizontal stabilizer. In FIG. 3, both tail components 10, 12 are rotated to a substantially horizontal position for take-off and landing, to avoid contact with the ground. Of course, and other angles of rotation for the components 10 and 12 are contemplated, as desired to (i) maximize capture of solar energy on the solar cells on each component, and (ii) provide for efficient flight and flight control.

The sizes of the tail components 10, 12 are preferably set such that each tail component provides approximately the same stabilizing effect to the airplane. Thus, the front tail component 10, which has a shorter moment arm to the aircraft center of mass than does the rear tail component 12, is preferably made proportionately larger than the rear tail component 12. To a first approximation, the product of moment arm length times component surface area is the same for the two tail components, but more precise sizing methods can be used when needed. With proper design, the stability of the aircraft, in both pitch and yaw, is made nearly constant, regardless of the roll orientation of the combined tails. The tail section shape may be rectangular, trapezoidal, triangular, or any desired shape. The component shapes may be the same or different as desired to (i) maximize capture of solar energy on the solar cells on each component, and (ii) provide for efficient flight and flight control.

For take off and landing, both tail components 10, 12 are preferably rotated into a nominally horizontal position, as depicted in FIG. 3. This minimizes the ground clearance required, and can greatly reduce the mass of the landing gear required for the aircraft. When the tail components are both nominally horizontal, there is little yaw control or stability provided by the tail components to the aircraft. In those situations, yaw control is provided by the differential thrust of multiple propulsion motors arranged along the main wing, or the drag of the wing may be manipulated by means of spoilers or other drag brake devices.

Because the tail components 10, 12 only need to be set to the horizontal position just before the actual landing touch down event in this embodiment, no significant maneuvering is required and thus only a minimal amount of yaw control is needed. Indeed, the lack of a vertical tail can reduce the sensitivity of the aircraft to a wind gust. For takeoff, either the tails are flat, or some sort of takeoff dolly is used to get sufficient ground clearance for the tails. Alternatively, the tails may be configured in a shallow X configuration, 0 to 20 degrees.

For solar energy collection, there are at least two options, depending on the requirements of the aircraft design. In one case, the larger front tail component 10 is fully covered with solar cells 14. The tail components are then rotated such that the front tail component 10 is essentially perpendicular to the direction of the sun. This maximizes the energy collection of that solar panel. The aft tail component 12 is kept approximately perpendicular to the front tail component 10, which maintains stability of the aircraft 16 while also minimizing the amount of shadow it might cast on the solar panels. This case maximizes the energy collection per solar cell, and thus is useful when the cost or mass of the solar cells are critical parameters.

In a second case, both tail components 10, 12 are covered (fully or partially) with solar cells 14, and the maximum solar energy collection occurs when both tail components are pointed approximately 45 degrees away from the sun (with the tail sections being disposed substantially 90 degrees, from each other). This configuration yields a collection loss due to the cosine of the angle, which is approximately equal to 0.707, but because the total area of solar panels is now greatly increased, the net collection is increased, in spite of the lower power per unit area of solar cells. Of course, alternative embodiments are envisaged wherein the second tail component 12 is covered (fully or partially) with solar cells and the first tail component 10 is devoid of such cells, or wherein both tail components are covered with solar cells to varying degrees depending on tail surface geometry.

If some variation in aircraft stability is allowable, it is possible to vary the angle between the tail components. For example, instead of being 90 degrees apart in the front view, angles of 45-120 degrees may be used; for example 60 and 120 degrees. This configuration would position the solar panels only 30 degrees off the line of the sun, with a cosine loss of about 0.86, which represents an increase in energy collection of 22%. The exact details of this configuration may be determined by the aircraft designer.

There are at least two options to control the roll angle of the tail components 10, 12: Either a motor driven servo 17 is used in the pivot 18, and/or small aileron type control surfaces 19a,b, 20a,b may be used on the tail components themselves. In the case where ailerons are used, it is possible to install a detent mechanism 21 (see FIG. 6) in the pivot. The detent mechanism 21 would hold a tail surface in a given orientation until some rotational moment is exceeded, and then the tail component is rotated into the next detent position. For example, the break-out moment may correspond to 25% of the maximum moment that could be applied by the aileron surfaces. That is, the detent may hold the tail component in a fixed roll orientation until the ailerons have deflected approximately 25% of their full travel. Aileron deflections larger than that may then be used to force the tail to move to a new orientation where it would again be retained by the detent. This configuration allows the control surface servos to be deactivated for much of the flight, reducing wear and tear on the servos.

Figure 6:
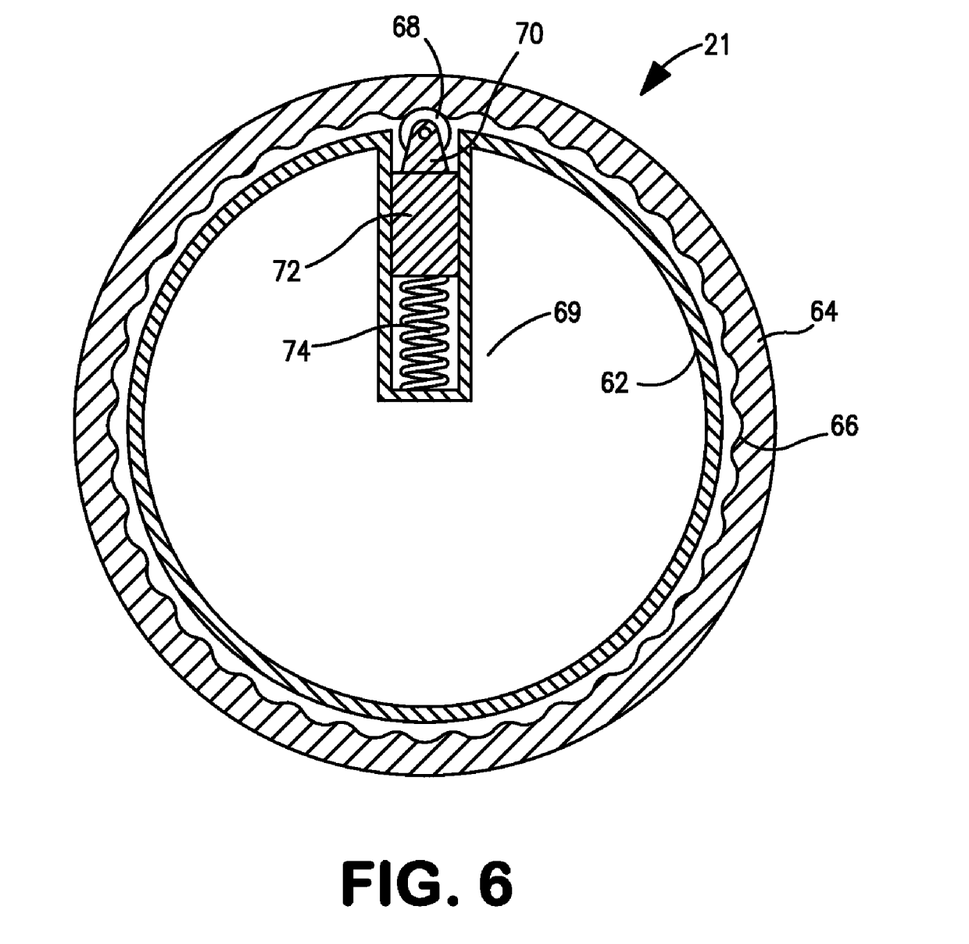
FIG. 6 illustrates a cross sectional view of a detent mechanism, according to a preferred embodiment of the present invention.

FIG. 6 is a cross sectional view of a detent mechanism 21. The inner ring 62 comprises the tail boom of the aircraft, and the outer ring 64, with the wavy inside surface 66 comprises the detent ring that is attached to the tail components 10, 12, and rotates about the boom (not shown bearings are preferably fore and/or aft of the detent ring 64). A rolling wheel 68 supported by bracket 70 and support 72 is contained within depression 69 in the inner ring 62. The wheel 68 is pushed against the wavy ring 66 with a spring 74. The assembly slides in a guide tube inside the tail boom 25. For small torques, when trying to roll the corresponding tail component about the boom centerline pivot axis A, the moment is resisted by the wheel 68 in a pocket of the detent ring 64. But, there is some force, determined by the shape of the pocket and the force of the spring 74, where the wheel 68 will roll out of the pocket and then drop into the next pocket. Furthermore, the ailerons on the corresponding tail component (or the ailerons on both tail components in the case where the components are fixed with respect to each other) can move the tail component from one detent to the next, but once there, the tails will preferably stay in place against moderate upsetting loads with little or no active control needed.

Figure 4:
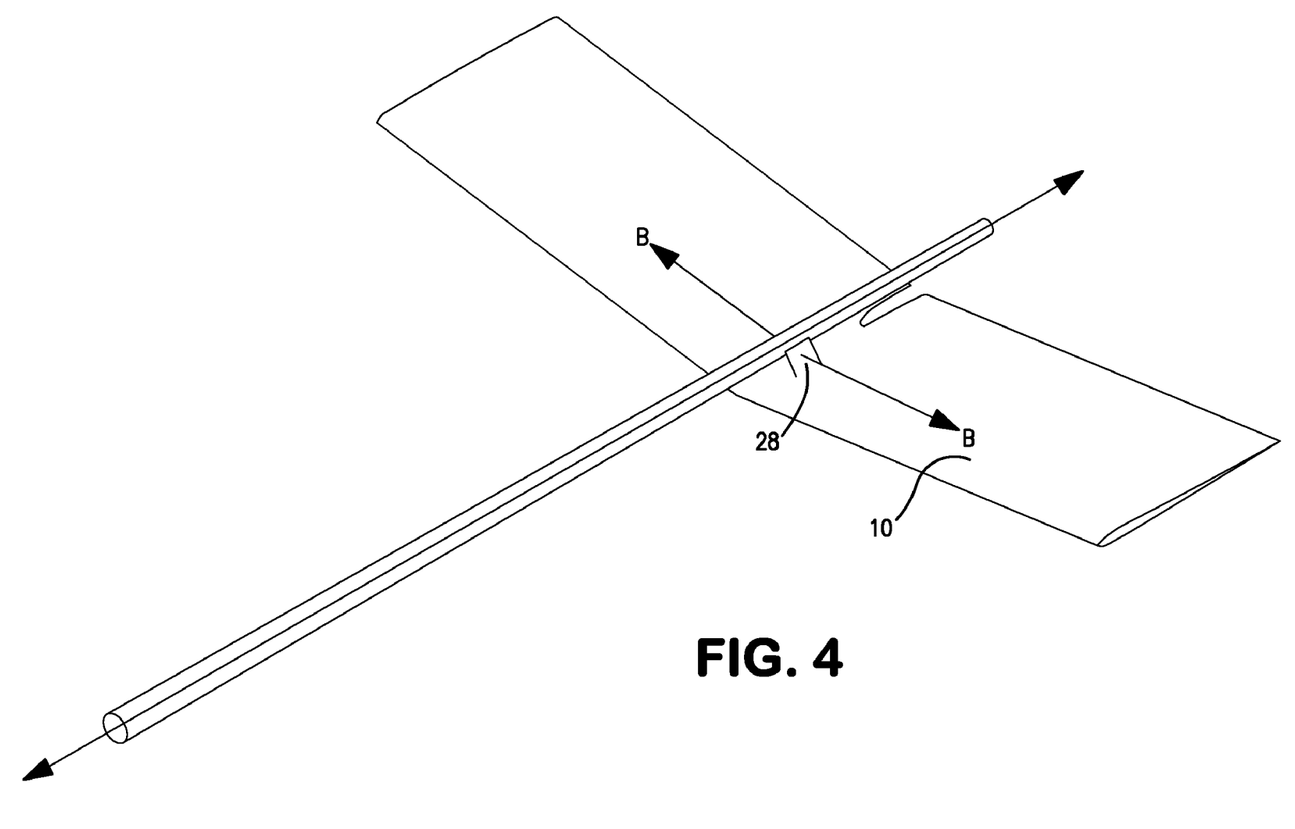
FIG. 4 illustrates a perspective view of a tail portion of an aircraft showing the roll and span-wise axes of one of the tail sections, according to a preferred embodiment of the present invention.
Figure 5:
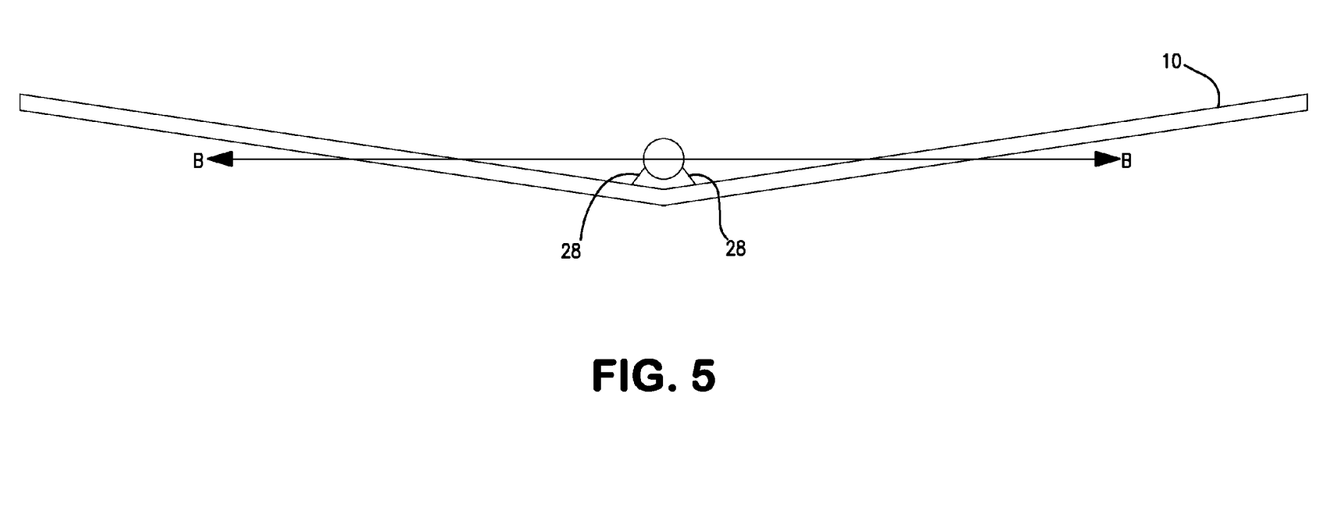
FIG. 5 illustrates a front view of a tail portion of an aircraft showing the span-wise axis of one of the tail sections, according to a preferred embodiment of the present invention.

In the above-described case of partial or full aileron control, it is preferable that the tail component surfaces be mass-balanced about the roll pivot axis A, as depicted in FIGS. 4 and 5. While not required with a servo drive, mass-balancing will reduce the servo loads.

The tail components 10, 12 may be pivoted and controlled independently about one or more roll axis pivots 18. This configuration would preferably use two sets of servos/actuators 17 and/or detents 21. However, because for almost all motions, the tail components will rotate to maintain a given (fixed or limited) roll axis angle relative to each other, it is possible to have the aft tail component pivot about an extension boom 23 from the front tail component 10, where the front tail 10 then pivots about the aircraft tail boom 25. Thus, for this embodiment, the aft tail pivot mechanism is only used at takeoff or landing, to make the aft tail component 12 parallel to the front tail component 10. For the remainder of the flight, the aft tail component 12 may be locked to the front tail component 14, thereby causing the two tail components to pivot in unison. This configuration has the advantage that if aileron controls 19a,b and 20a,b are used, either set of ailerons (on the two tail components) can control the entire group, thus providing a measure of redundancy.

The tail components 10, 12 themselves may comprise either a conventional fixed surface plus moving control surface (i.e. horizontal stabilizer plus elevator). Alternatively, each tail component surface may rotate about respective pivot axes B, C, D, E (or, if little or no dihedral, axes B and D) for control (i.e., a "full flying" tail, where the entire tail surface is pivoted about an axis for control instead of just a fraction of the surface at the back that is hinged). A roll pivot mechanism 18' may be provided within each pivot mechanism 18, or separately therefrom. Each such roll pivot mechanism 18' may include at least one servo 17' and at least one detent 21', which is preferably configured to (i) hold the first tail component 10 at a first predetermined roll angle until a first predetermined roll moment is applied to the first tail component 10, and (ii) hold the second tail component 12 at a second predetermined roll angle until a second predetermined roll moment is applied to the second tail component 12. The full flying tail has advantages for a continuous solar panel 14 and has also proven to have lower weight for solar aircraft type structures. These full flying tails may be configured to pivot about one or more axes extending from the roll axis pivot, but that configuration results in separate surfaces that should be controlled, and it also causes an air gap 26 between the root of the surface and the roll pivot assembly. This type of gap is known to produce very high air drag due to airflow around the root of the airfoil.

To avoid this gap 26, the tail components may be offset on a strut 28, as depicted in FIGS. 4 and 5. The tail components may be built with a dihedral angle, such that the center of mass of the tail assembly still lies on the roll pivot axis A (FIGS. 4 and 5). Each spanwise pivot axis B, C, D, E is then preferably the same as the strut to roll pivot intersection, because that minimizes the mass and aerodynamic moments the servo has to overcome. The designer then has to trade off the height of the strut versus potentially cutting a clearance slot in the trailing edge of the surface. Any slot at the root of the surface causes drag, but a slot at the trailing edge (as shown in FIG. 1) is much less penalty than a full length slot or a slot at the leading edge. The control surface pivot (pitch) is shown along axis B, while the roll pivot is along axis A. The entire first tail component 10 surface pivots about the axis B to give pitch or yaw control, while the entire assembly can rotate about the roll axis A to point the solar cells 14 at the sun.

A control system 31 may be mounted on the aircraft frame, adjacent one or more of the pivot mechanisms 18, and/or made part of one or more aircraft flight control computer(s). The control system 31 preferably controls the rotation of the tail components 10, 12, and preferably controls the servos 17 and detents 21 to change the angles of the tail components. The most preferred embodiment uses one or more servos to move each whole tail component surface, with no detents. Or, if the ailerons 19a,b and 20a,b are used, then detents may optionally be used therewith to reduce servo activity and thus wear. The control system 31 may include one or more photo sensors for calculating the direction to the sun so that the proper angles and rotations may be automatically calculated to optimize the solar energy produced by the solar cells 14. Alternatively, or in addition thereto, the angles and rotations may be calculated from the solar cells 14 on one or both of the tail sections.

The control system 31 may also control the rotation of each tail section about the spanwise axes B, C, D, E. That is, the control system 31 preferably controls the first tail component 10 so that it is (i) pivotable about first spanwise axes B, C (or just B if only one axis) of the first tail component 10, and (ii) rotated about the first spanwise axes B, C (or just B) such that first tail component yaw and/or pitch control moments are caused. Likewise, control system 31 preferably controls the second tail component 12 so that it is (i) pivotable about second spanwise axes D, E (or just D) of the second tail component 12, and (ii) rotated about the second spanwise axes D, E (or just D) such that second tail component yaw and/or pitch control moments are caused. Moreover, the control system 31 may sense the roll attitude of each of the two surfaces of each of the first and second tail components and use the ailerons 19a,b and/or 20a,b to control the orientation of each of the first and second tail components 10, 12. The control system 31 may also sense the roll attitude of each of the two surfaces of each of the first and second tail components 10, 12, and use a motorized actuator (e.g., servo) 17' to control an orientation of each of the first and second tail components.

While the foregoing detailed description has described particular preferred embodiments of this invention, it is to be understood that the above description is illustrative only and not limiting of the disclosed invention. While preferred embodiments of the present invention have been shown and described herein, it will be obvious to those skilled in the art that such embodiments are provided by way of example only. Numerous variations, changes, and substitutions will now occur to those skilled in the art without departing from the invention.

What is claimed is:

1. An aircraft, comprising:
   a tail section having a first tail component and a second tail component, the first tail component being positioned further forward than the second tail component with respect to a nose of the aircraft, each tail component having two surfaces,
   each of the two surfaces of at least one of the first and second tail components comprises a solar panel configured to collect solar energy; and
   each tail component is rotatable with respect to a longitudinal centerline of the aircraft such that an offset angle of between zero degrees and 180 degrees is formed between corresponding surfaces of the first and second tail components.

2. The aircraft of claim 1, wherein the first and second tail components are aligned substantially horizontally with respect to ground such that the offset angle is between zero degrees and five degrees and such that the aircraft is configured for takeoff or landing.

3. The aircraft of claim 1, wherein the first and second tail components are rotated such that the offset angle is between 45 degrees and 90 degrees while the aircraft is in flight.

4. The aircraft of claim 3, wherein the offset angle is set such that a collectable amount of solar energy by the solar panels is maximized.

5. The aircraft of claim 1, wherein the first tail component is rotated such that at least one of the two first tail component surfaces directly faces the sun while the aircraft is in flight.

6. The aircraft of claim 1, wherein each of the first tail component and the second tail component is rotated such that their respective surfaces are disposed at angles of substantially 40 to 50 degrees with respect to the sun while the aircraft is in flight.

7. The aircraft of claim 1, wherein the first tail component is rotated such that the total solar energy collected by the first tail component surfaces is maximized.

8. The aircraft of claim 1, wherein the second tail component is rotated such that at least one of the two second tail component surfaces directly faces the sun while the aircraft is in flight.

9. The aircraft of claim 1, wherein the second tail component is rotated such that the total solar energy collected by the second tail component surfaces is maximized.

10. The aircraft of claim 1, wherein the first tail component is rotated such that an angle between at least one of the two first tail component surfaces and the sun is between 40 degrees and 50 degrees, and wherein the second tail component is rotated such that an angle between at least one of the two second tail component surfaces and the sun is between 40 degrees and 50 degrees, and wherein the offset angle is between 80 degrees and 100 degrees.

11. The aircraft of claim 1, wherein the first tail component comprises a first center of mass, the first center of mass being positioned along a roll pivot axis of the tail component, and wherein the second tail component comprises a second center of mass, the second center of mass being positioned along the roll pivot axis of the tail component.

12. The aircraft of claim 11, wherein the two surfaces of each of the first and second tail components provides a dihedral angle configured to ensure that the first and second centers of mass are positioned substantially along the roll pivot axis of the aircraft.

13. The aircraft of claim 12, wherein each of the two surfaces of each of the first and second tail components has a roll pivot axis that does not lie on the roll axis of the aircraft.

14. The aircraft of claim 1, wherein the first tail component is (i) pivotable about a first spanwise axis of the first tail component and (ii) configured to be rotated about the first spanwise axis such that a first tail component pitch control moment is caused; and wherein the second tail component is (i) pivotable about a second spanwise axis of the second tail component and (ii) configured to be rotated about the second spanwise axis such that a second tail component pitch control moment is caused.

15. The aircraft of claim 14, wherein each of the two surfaces of each of the first and second tail components is offset from a boom portion of the aircraft to allow for free rotation of each tail component about the corresponding spanwise axis.

16. The aircraft of claim 14, wherein each respective spanwise axis intersects a roll pivot axis of the aircraft.

17. The aircraft of claim 1, wherein the first tail component is (i) pivotable about a first spanwise axis of the first tail component and (ii) configured to be rotated about the first spanwise axis such that a first tail component yaw control moment is caused; and wherein the second tail component is (i) pivotable about a second spanwise axis of the second tail component and (ii) configured to be rotated about the second spanwise axis such that a second tail component yaw control moment is caused.

18. The aircraft of claim 17, wherein each of the two surfaces of each of the first and second tail components is offset from a boom portion of the aircraft to allow for free rotation of each tail component about the corresponding spanwise axis.

19. The aircraft of claim 17, wherein each respective spanwise axis intersects a roll pivot axis of the tail component.

20. The aircraft of claim 1, further comprising a control system configured for sensing a roll attitude of each of the two surfaces of each of the first and second tail components and for using ailerons to control an orientation of each of the first and second tail components, each of the ailerons being mounted to a respective one of the two surfaces of each of the first and second tail components.

21. The aircraft of claim 1, further comprising a roll pivot mechanism having at least one detent, the at least one detent being configured to hold the first tail component at a first predetermined roll angle until a first predetermined roll moment is applied to the first tail component.

22. The aircraft of claim 1, further comprising a roll pivot mechanism having at least one detent, the at least one detent being configured to hold the second tail component at a second predetermined roll angle until a second predetermined roll moment is applied to the second tail component.

23. The aircraft of claim 1, further comprising a control system configured for sensing a roll attitude of each of the two surfaces of each of the first and second tail components and for using a motorized actuator to control an orientation of each of the first and second tail components.

24. An aircraft tail section, comprising:
at least a first tail component and a second tail component, the first tail component being positioned further forward than the second tail component with respect to a nose of the aircraft;
at least one of the first and second tail components includes a solar panel configured for collecting solar energy; and
at least one pivot mechanism configured to rotate at least one of the first tail component and the second tail component about a longitudinal centerline of the aircraft such that an offset angle of between zero degrees and 180 degrees is formed between corresponding surfaces of the first and second tail components.

25. An aircraft tail section according to claim 24, wherein the at least one pivot mechanism is configured to independently rotate the first tail component and the second tail component about a centerline of the aircraft.

26. An aircraft tail section, comprising:
a tail boom and a tail section, the tail boom extending rearwardly with respect to a nose of the aircraft along a longitudinal centerline of the aircraft, and the tail section including at least a first tail component and a second tail component, the first tail component being positioned further forward than the second tail component with respect to a nose of the aircraft, the first tail component being coupled to said tail boom:
at least one of the first and second tail components including a solar panel configured for collecting solar energy; and
a pivot mechanism configured to rotate the first tail component with respect to the tail boom, the first tail component comprising a first tail component boom extending rearwardly with respect to the nose of the aircraft along the centerline of the aircraft, wherein the second tail component is coupled to and rotatable with respect to the first tail component boom such that an offset angle of between zero degrees and 180 degrees is formed between corresponding surfaces of the first and second tail components.

27. The aircraft of claim 26, wherein the second tail component is configured for independent rotation with respect to the first tail component only during takeoff and/or landing, the takeoff portion including a first predetermined interval at a beginning of a flight and the landing portion including a second predetermined interval at an end of the flight, and wherein the second tail component is configured to be in a locked position with respect to the first tail component during a remainder of the flight.

28. A method of collecting solar energy on a tail section of an aircraft, comprising:
 disposing a first tail section fore of a second tail section, with respect to a front of the aircraft;
 rotating each of the first and second tail sections to substantially 0 to 5 degrees with respect to ground during takeoff;
 after takeoff, relatively rotating the first and second tail sections so that (i) at least one of the first and second tail sections is disposed at substantially 45-90 degrees with respect to a direction to the sun, and (ii) the other of said first and second tail sections is disposed at substantially 45-120 degrees with respect to said at least one of the first and second tail sections.

\* \* \* \* \*